March 26, 1968  R. ANTRAIGUE  3,375,153
MACHINE FOR TREATING PNEUMATIC TIRES
Filed March 19, 1964  8 Sheets-Sheet 1

Fig. 1

ROGER ANTRAIGUE
INVENTOR

Karl J. Ross
AGENT

March 26, 1968 R. ANTRAIGUE 3,375,153
MACHINE FOR TREATING PNEUMATIC TIRES
Filed March 19, 1964 8 Sheets-Sheet 3

ROGER ANTRAIGUE
INVENTOR

Karl F. Ross
AGENT

March 26, 1968  R. ANTRAIGUE  3,375,153
MACHINE FOR TREATING PNEUMATIC TIRES
Filed March 19, 1964  8 Sheets-Sheet 7

ROGER ANTRAIGUE
INVENTOR

Karl F. Ross
AGENT

United States Patent Office 3,375,153
Patented Mar. 26, 1968

3,375,153
MACHINE FOR TREATING PNEUMATIC TIRES
Roger Antraigue, 202 Quai de Jemmapes,
Paris 10°, Seine, France
Filed Mar. 19, 1964, Ser. No. 353,659
Claims priority, application France, Mar. 21, 1963,
928,798; July 2, 1963, 940,154
11 Claims. (Cl. 156—410)

ABSTRACT OF THE DISCLOSURE

Machine for reconditioning a worn tire which is held between a pair of parallel disks engaging the beads of the tire and sealing the interior thereof to enable the introduction of a pressure fluid (air) to stiffen the tire for a treatment of its outer surface by cutting and scraping tools.

The present invention relates to an improved machine for treating pneumatic tires. The machine according to the invention has for its object: (1) to peel off the treads of a worn tire, (2) to scrape the same clean, (3) to apply an adhesive, and (4) to wind a new tread and press it onto the tire thus prepared for retreading, all these operations being effected without removing the tire even once from the machine.

In order to enable this sequence of reconditioning operations to be achieved, the machine accomplishes the following operations: (1) lifting the tire, (2) placing same on a two-section false rim, (3) rigidifying the tire by subjecting it to an inwardly directed pressure, (4) moving its cords the desired distance apart, and (5) aligning the median plane with that of the machine, without requiring any adjustment and, consequently, without any possible error.

On the machine according to the invention, the peeling and scraping operations impart to the unevenly worn tire an external shape which is (1) concentric relative to its cords, i.e. to its axis of rotation, and (2) symmetrical with respect to the mean longitudinal plane, thus conforming to the shape of the desired retread.

The fact that all these operations are effected on a single machine (1) affords a substantial saving of time with respect to known machines, which may be capable of performing only one or a few of the operations listed, (2) avoids a cumbersome storage of material between operating stations, as is the case with the presently known machine which do not carry out all these operations, (3) avoids soiling during the intermediate handling, (4) reduces by 50% the time necessary for performing these operations, and (5) requires the presence but of one operator for all this sequence of operations who is alone responsible for the work, whereas up to the present the necessity of using several machines and several operators makes it difficult to identify the workman responsible for a defect uncovered at the end of the operations.

The invention will be best understood from the following description and the appended drawing wherein.

Figure 1:
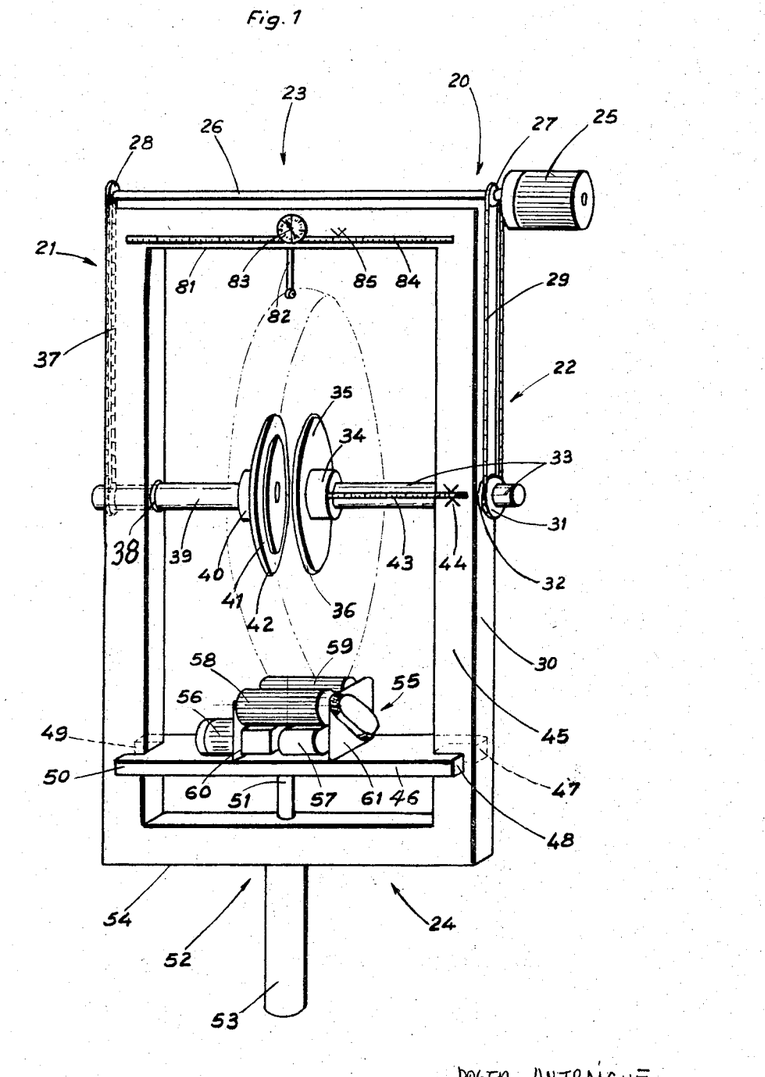
FIG. 1 is a diagrammatic perspective view of a frame forming part of a machine according to the invention.

The machine or device shown in the drawing comprises a framework 20 of a generally rectangular shape (FIG. 1), formed with two vertical uprights 21 and 22, an upper horizontal bar 23 and a lower horizontal bar 24. At one of the upper corners of the frame—which, in FIG. 1, is the upper right-hand corner—an electric motor 25 is mounted. On the shaft 26 of motor 25 are secured a first pinion 27 adjacent said motor 25, and a second pinion 28 at the outer end of shaft 26 whose length is slightly greater than that of bar 23. Said shaft is supported on bearings (not illustrated). A chain 29, in engagement with pinion 27, is located opposite the outer face 30 of upright 22 and meshes a pinion 31. Said pinion is integral with nut 32 mounted for rotation on upright 22 which supports the same, means being provided to prevent the longitudinal motion of said nut relative to said upright; a threaded spindle 33 cooperates with the screw thread of said nut, the outer end portion of said spindle protruding beyond upright 22 while the inner end portion thereof rotatably and axially nonshiftably supports, by means of a hub 34, a disc 35 whose edge 36 has a profile shaped as a halfrim.

The outer pinion 28 is adapted to drive, through a chain 37, a nut 38, symmetrical to nut 31 relative to the mean vertical plane of frame 20, a threaded spindle 39 symmetrical with threaded spindle 33 cooperating with the screw thread of nut 38; spindle 33 carries at its end, through the intermediate of a hub 40, a disc 41 whose edge 42 presents a profile shaped as a half-rim. One of said cores, here the core 34, carries a graduated rule 43 parallel to the common axis of the threaded spindles 33 and 39 which moves in front of a pointer 44 marked on the front face 45 of upright 22.

A transverse platform 46 is arranged at the lower portion of frame 20, between uprights 21 and 22 and slidably engages the latter by means of its forked U-shaped end portions 47, 48 and 49, 50. The girder 46 is supported by a ram 51 of a lifting jack 52 whose body 53 is secured to the lower face 54 of the horizontal lower bar 24 of frame 20. Platform 46 supports a rotary driving assembly 55 including an electric motor 56 and a reduction gear 57 which drives two peripherally corrugated cylinders 58 and 59 whose shafts are supported by cheeks or flanges 60 and 61.

Figure 6:
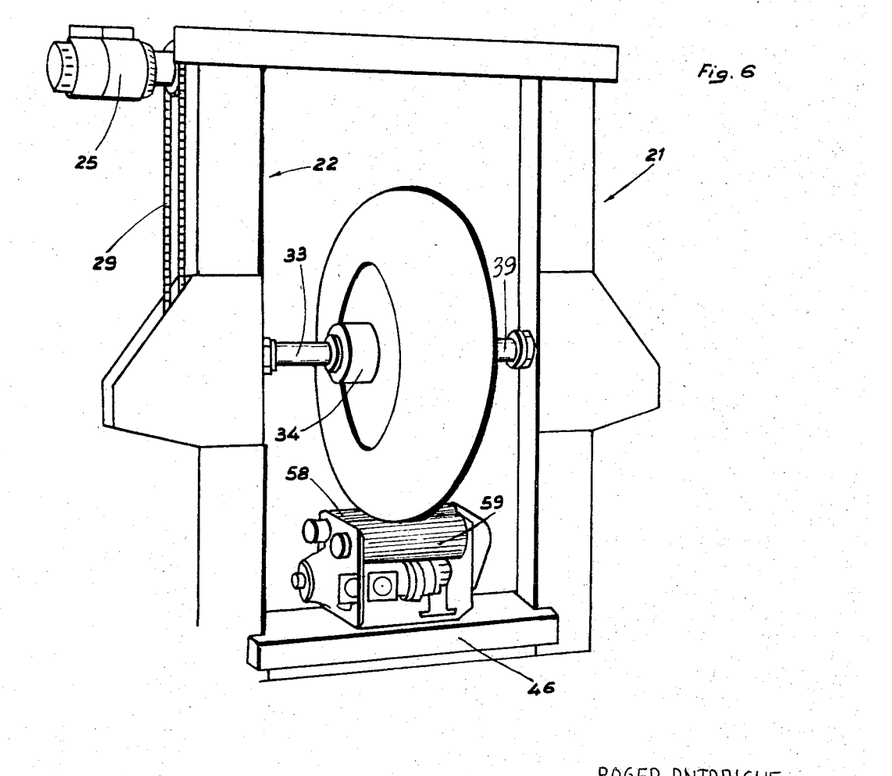
FIG. 6 is a perspective front view of the machine, with omission of associated implements.

Uprights 21 and 22 of the frame are integral with horizontal guide rods 62 and 63 (FIG. 2) with which cooperate slide blocks such as 64 and 65, respectively. These slide blocks are spanned by two axially extending rods or cross-bars 66 and 67 (see also FIG. 6), which are adapted to guide two tool-holder carriages 68 and 69. The forward movement of the sliders 64 and 65 along rods 62 and 63, controlled by means of a handwheel 70, is performed by self-locking chain in such a way that movement is blocked as soon as handwheel 70 is no longer actuated. The individual movement of carriages 68 and 69 along cross-bars 66 and 67 is effected by handwheels 71 and 72, respectively, and is controlled by means similar to those provided for the sliding blocks 64 and 65. Integral with these sliding blocks is also a gauge-holder 73 on which is detachably mounted a gauge 74. The tools of carriages 68 and 69 are carried by supports 75 and 76 which are integral with gauge-contacting rollers such as 77 and 78 and which are subjected to the action of lifting jacks 77' and 78'.

In the embodiment as shown in the drawing, carriage 68 is fitted with a rotary knife 79, cylindrically shaped (FIG. 2), acting through its upper edge, and arranged to have its axis suitably adjusted. Carriage 69 is equipped with a rasp 80.

A finger 82 projects downwardly from the lower face 81 of upper bar 23 (FIG. 1) and a measuring instrument is provided whose dial is shown at 83. A graduated strip 84 is also provided on the upper bar 23 along with a pointer 85.

Figure 2:
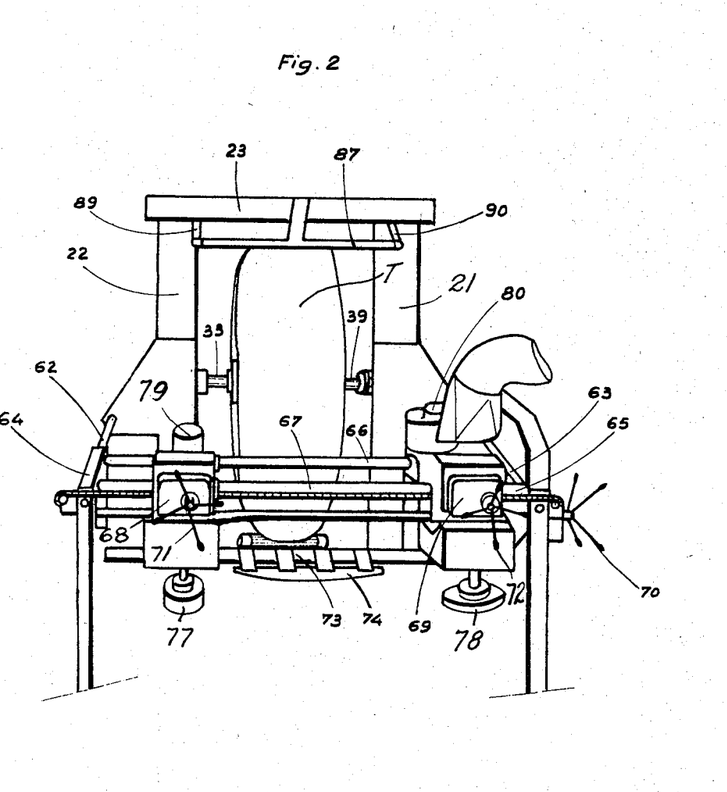
FIG. 2 is a diagrammatic perspective view, in front elevation, of the machine shown in FIG. 1.
Figure 3:
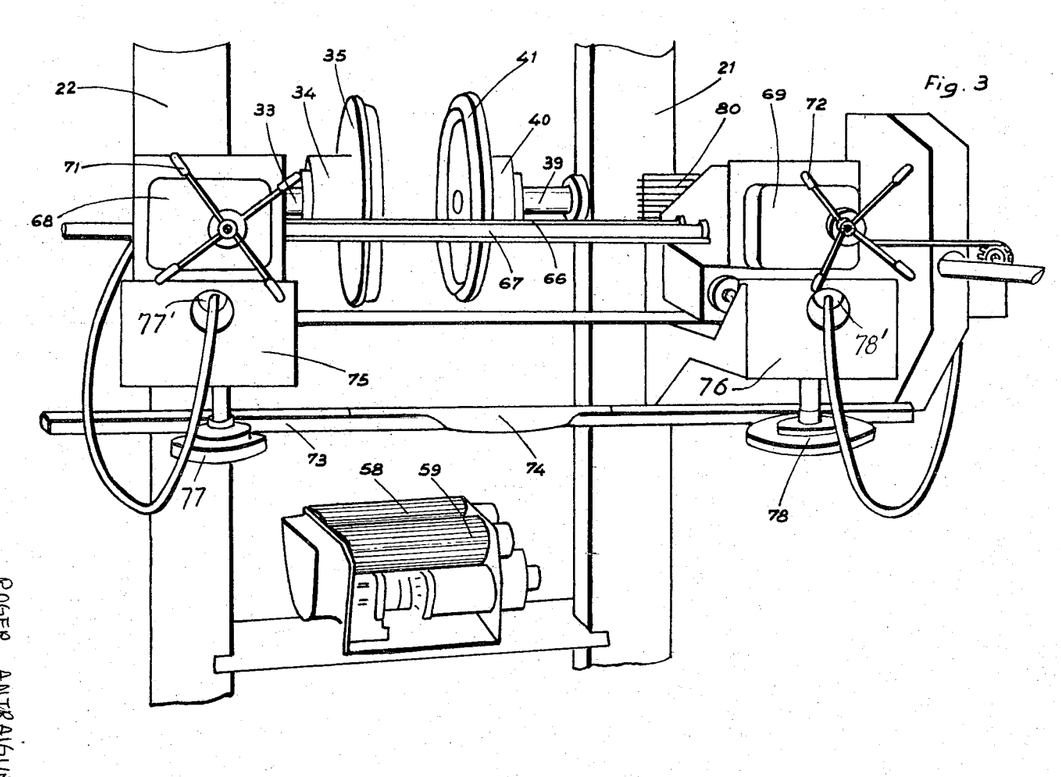
FIG. 3 is a perspective front view of a portion of the machine, drawn to a larger scale than in FIG. 2.
Figure 4:
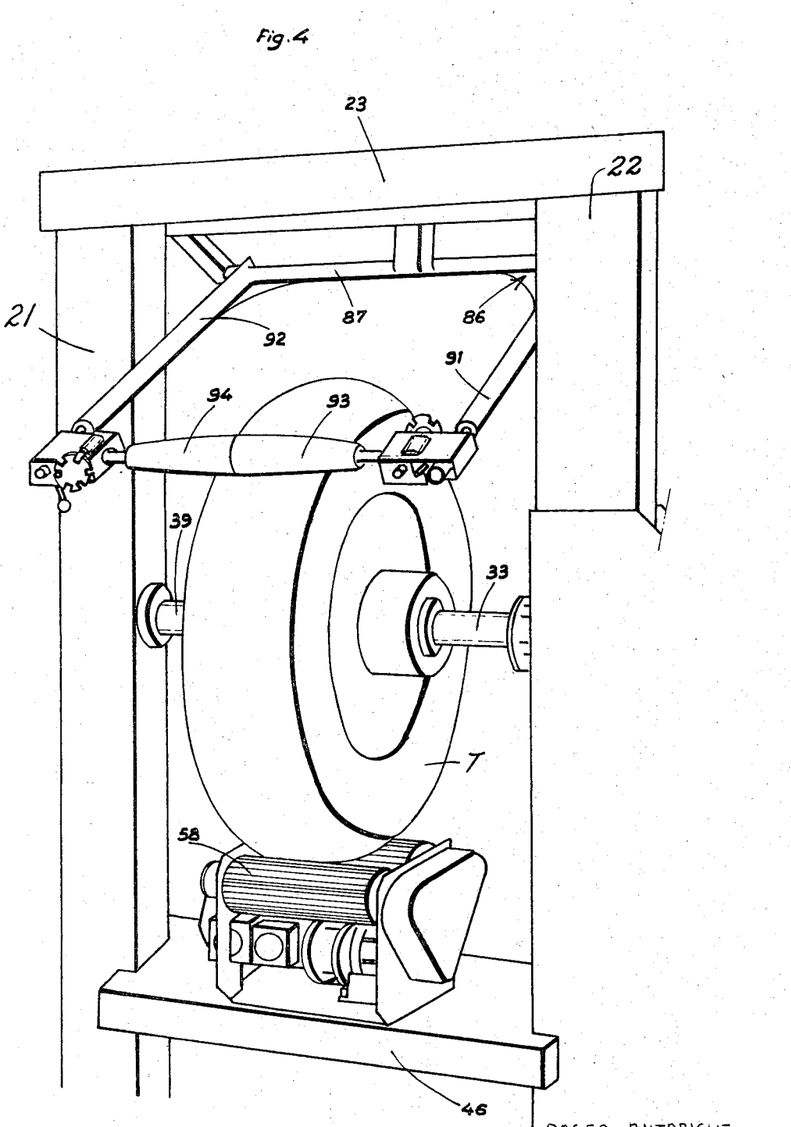
FIG. 4 is a perspective rear view of the machine.
Figure 5:
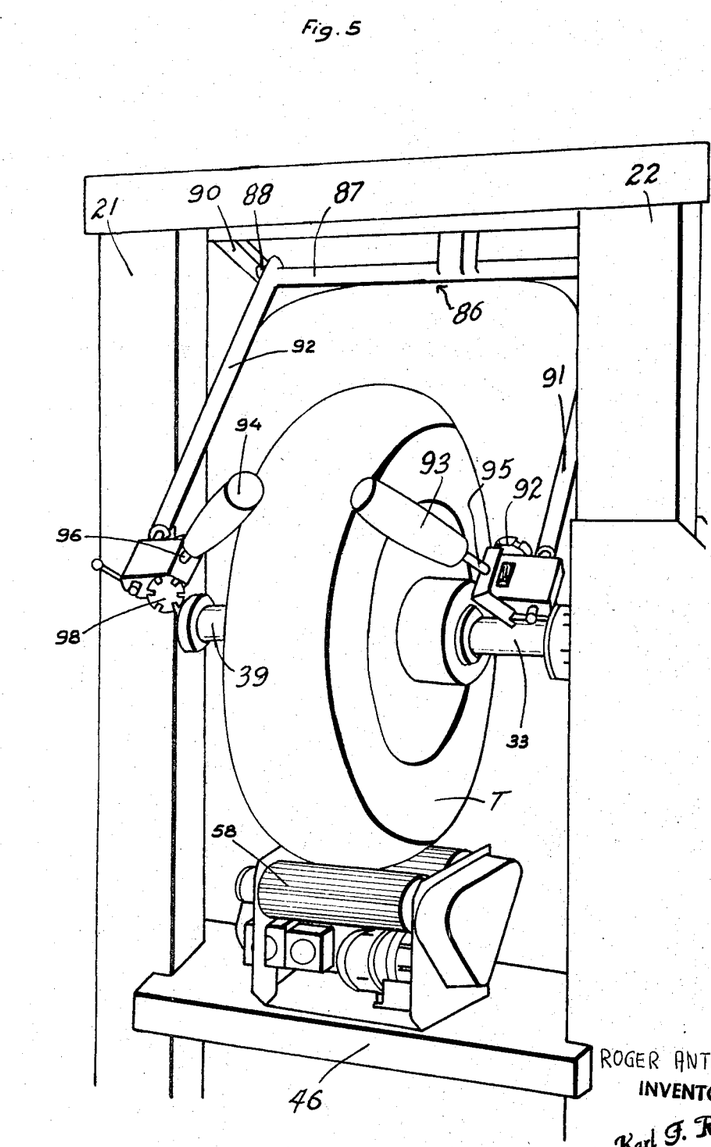
FIG. 5 is a view similar to that of FIGURE 4, showing a different operating stage.

A yoke 86 (FIGS. 4 and 5) is swingably mounted, by its horizontal member 87, on a rod 88 supported on arms 89 and 90 (FIG. 2). At the end portions of branches 91 and 92 of said yoke 86 are provided rollers 93 and 94 which are adapted to rotate about their axes and whose shafts 95 and 96 are swingable about axes 97 and 98.

The machine according to the invention operates as follows:

The pneumatic tire T to be treated is rolled onto cylinders 58 and 59 which are then in the plane of the floor or at a slightly raised level, discs or plates 35 and 41 being sufficiently spaced apart from one another to enable the passage of the tire. The jack 52 is operated so as to lift the tire in such a manner as to bring its axis to the level of the axis common to both threaded spindles 39 and 33. Motor 25 is then actuated and, through chains 29 and 37 and nut members 32 and 38, causes said threaded spindles 33 and 39 to move and bring the half-rims 36 and 42 to cooperating engagement with the cords of the pneumatic tire, in a manner similar to that of a wheel rim of a motor vehicle; by actuating motor 25, the discs 35 and 41 with their tire-seating rims 36, 42 are brought into a relative position determined by the spacing of the tire cords, as indicated by the graduated strip 43 opposite pointer 44; pressure fluid is then admitted into the space defined on the one hand by the confronting faces of plates 41 and 35 and on the other hand by the tire itself, whose interior is sealed by these plates and which will then assume its inflated shape while acquiring a rigidity facilitating its subsequent treatment. The movements of the plates or discs 35 and 41 being constantly symmetrical with respect to the mean vertical plane of frame 20, the mean vertical plane of the tire carcass coincides under operating conditions with said mean vertical plane of frame 20.

Motor 56 is then actuated, driving cylinders 58 and 59 onto which the tire T, securely held by the plates or discs 35 and 41, bears under the pressure of jack 52. The tire is then rotated with a given constant peripheral speed.

By actuating the handwheel 71, carriage 68 is brought into a median position along cross-bars 66 and 67, while upon releasing said handwheel, the carriage is being blocked in this position. The median position is indicated by the midpoint of the tread of the tire to be treated. Jack 77' is pressure-actuated, causing roller 77 to come to rest against the edge of the selected guage 74. The cross-bars 66 and 67 carrying the carriage 68 are then moved forward towards the tire, by actuating handwheel 70. When the edge of the cylindrical knife 79 engages the tire driven at high speed by the rotating cylinders 58 and 59, said knife will cut into the tire, this operation continuing until the desired depth of cut sensed by finger 82 is read on dial 82. Upon a release of handwheel 70, carriage 68 is blocked in the position thus reached. Handwheel 71 is then actuated, causing the movement of carriage 68 in a given direction, e.g. first to the left, along the cross-bars 66 and 67. During this movement, the rotating knife 79 will bring the corresponding half-portion of the tire to the desired profile corresponding to that of the selected gauge 74. When this operation is finished, pressure is released in jack 77' and, by actuating handwheel 71, the carriage 68 is restored to the median position. The carriage is blocked in this position, and pressure is again applied to the jack and, by means of handwheel 71, carriage 68 is shifted transversely from this median position up to the other end of cross-bars 66 and 67, i.e., in the case considered, to the right, this operation—with the tire still rotating at high speed—resulting in a shaping to the desired profile of the other half of the tire. Pressure is again released in jack 77' and the actuation of handwheel 71 will restore carriage 68 to the left end of cross-bars 66 and 67.

The actuation of handwheel 72 will then carry the carriage 69, which up to this moment remained at the right end of cross-bars 66 and 67, into the median plane of symmetry. Pressure is then applied to jack 78', causing roller 78 to bear against the edge of gauge 74 and urging the rasp 80 against the tire. Carriage 69 is then moved first into one direction, e.g., to the right, by actuating handwheel 72, thus scraping one half of the tire, according to the profile desired. At the end of the displacement, pressure is released in the jack 78' and the carriage is restored to the median position; pressure is again admitted to the jack, and the carriage is moved towards the opposite end, i.e. to the left, in order to scrape the other half of the still rotating tire. Pressure is then released in jack 78', and the rasp-carrying carriage 69 is moved again to its right-end position.

The gluing and the application of a tread of raw rubber are effected without removing the tire from discs or plates 35 and 41 supporting same. The application of a rubber tread under pressure is performed by rollers 93 and 94.

In a machine according to the invention, the gauge 74 is protected against contamination by rubber powder; it is placed in an easily accessible location, facilitating its replacement and the visual checking of the accuracy of reproduction. In addition, it is readily possible to move the gauge to the exact position desired, by reading the dial 83 or the ruler 84.

The same gauge provides guidance for the rotary cutting knife 79 as well as for the scraping tool 80.

With a machine according to the invention, dangerous tools such as the knife and the rasp are located inside the enclosure formed by the framework 20, the guide-arms 62 and 63 and cross-bars 66 and the 67, and therefore are out of the reach of an absent-minded or clumsy operator.

The invention has also for its object to provide means for supporting a tire carcass or frame by its internal edges or beads, said means presenting a central symmetry so that, during its rotation, the pneumatic tire remains in a centered position and may thus be suitably treated by using positively guided tools, in a manner similar to that realizable with machine tools for working on rigid materials.

Thus, in accordance with the invention, the tire is supported by its beads by means of a plurality of annular segments which are resiliently applied against said beads and which partake in the rotation of the tire supporting flanges or plates.

Figure 7:
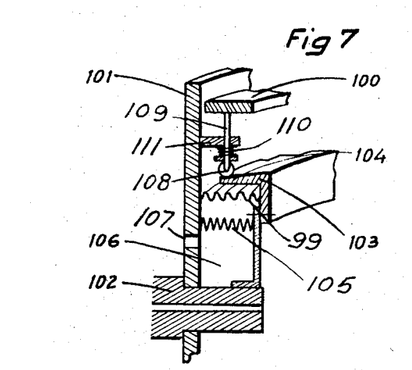
FIGS. 7 to 10 are diagrammatic views in diametrical section of various embodiments of a device for supporting a tire.

FIG. 7 illustrates one embodiment of such an assembly wherein an annular clamping segment 100 for supporting the carcass or frame is automatically urged away from the axis of rotation by the admission of pressure air between the tire-supporting flanges or plates, one of which is shown at 101, through a duct 102; a sleeve 103 formed with a tapered ramp portion 104 will thus be moved along the axis against the action of a spring member 105 in a compartment 106 bounded by a bellows 99, the air of compartment 106 being allowed to escape through an aperture 107 formed in flange 101. Radial motion is imparted to segment 100 by a roller 108 carried at the end portion of a rod member 109, the roller being cammed outwardly against the action of a spring 110 acting against a stop 111.

Figure 8:
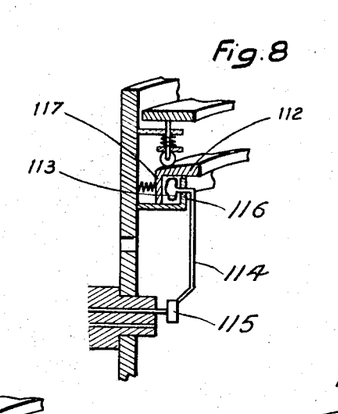

In the embodiment shown in FIG. 8, the movement of the sleeve formed with the ramp 112 is effected, rather than by the pressure of a tire-inflating fluid, by admitting pressure fluid into a circular inner tube 113 through a duct 114 connected to a rotary joint 115, the inner tube 113 being inserted between a flange 116 and the annular end wall 117 of the sleeve.

Figure 9:
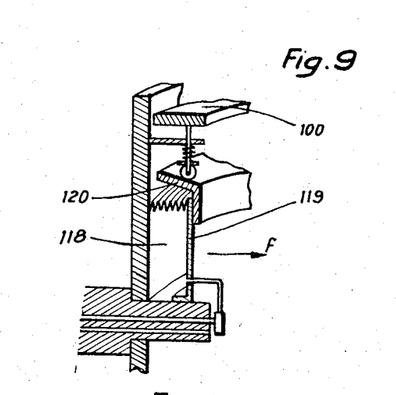

In the embodiment illustrated in FIG. 9, the admission of pressure air into a compartment 118 moves, in the direction of arrow f, a slidingly mounted partition 119 which drives the ramp-carrying sleeve 120 and which tends to increase, for the direction of motion indicated, the diameter of the bearing surface provided by segments 100.

Figure 10:
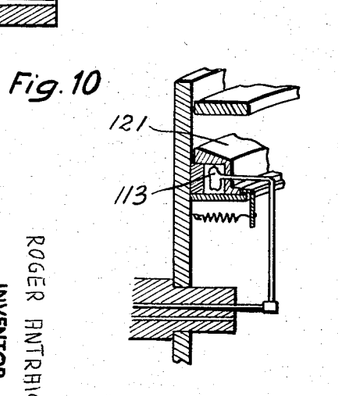

The embodiment shown in FIG. 10 is similar to that of FIG. 8, the sloping portion 121 being oppositely inclined to that of sleeve 112, the whole arrangement being correspondingly modified.

Figure 11:
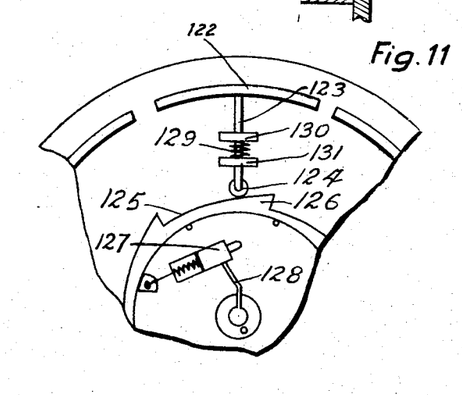
FIG. 11 is a frontal partial diametrical view of another embodiment.

In FIG. 11, there is illustrated a further embodiment wherein a segment 122 is supported on a rod member 123 whose other end carries a roller 124. The latter cooperates with a cam portion 125 formed on a rotatably mounted ring 126 which is adapted to be driven by a jack 127 fed through a duct 128; the return force is provided by a spring member 129 inserted between two shoulders 130 and 131.

Figures 12, 13, 14, 15, 16:
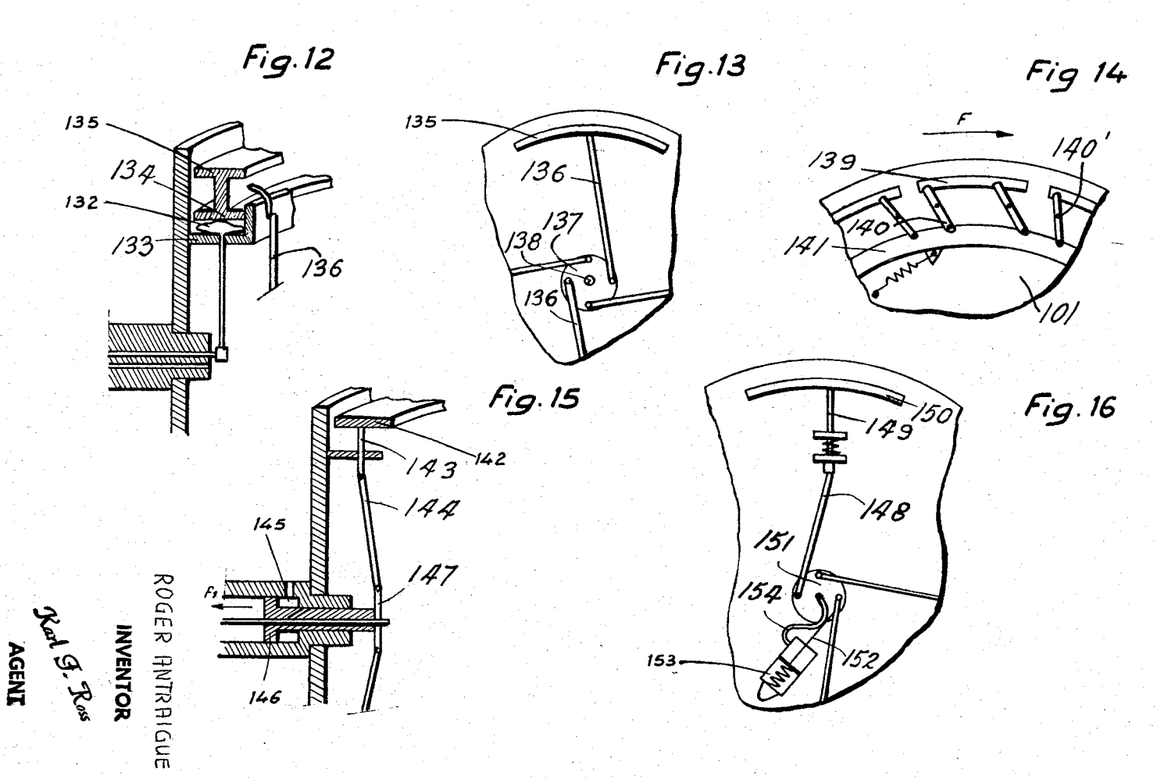
FIG. 12 is a view similar to FIGS. 7 to 10, but for still another embodiment.
FIG. 13 is a frontal partial view of the device shown in FIG. 12.
FIG. 14 is a view similar to FIGURE 11, but for a further embodiment.
FIG. 15 is a view similar to FIGS. 7 to 10, but for yet another embodiment.
FIG. 16 is a view similar to FIG. 11, but for still another embodiment.

In the embodiment according to FIG. 12, the segment-separating operation is achieved by inflating an inner tube 132 which bears against a flange 133 and pushes away the flange 134 of an I-profile 135. The various segments 135, as may be seen in FIG. 13, are interconnected by means of connecting links 136, which are articulated at their inner ends to a disk 137 rotatably mounted by a central aperture 138.

Reference is now made to FIG. 14. In this embodiment, the tire rests, by its bead portion, on segments 139, each of which is carried on the ends of two connecting links 140, whose other ends are pivotally mounted on a ring 141, the resulting assembly forming an articulated parallelogram whose links are pivoted at 140' to the adjacent disk 101. When the carcass is rotated by peripheral engagement in the direction of arrow F, it will tend to entrain in that direction the upper segments 139 on which it rests, thus automatically urging these segments away from the axis of rotation; the motion of the ring 141 will apply the lower segments against the beads of the tire. The outer face of segments or shoes 139 is preferably notched or knurled.

Reference is now made to FIG. 15: in this embodiment, a circular segment 142 is integral with a rod member 143 articulated to a link 144 which, by an action similar to that of the frame of an umbrella, tends to push shoe 142 away from the axis of rotation when pressure is admitted into an annular compartment 145 to displace a piston 146 in the direction of arrow $f_1$, the end portion of the piston rod carrying a ring 147 to which are articulated the various links 144.

Finally, in the embodiment shown in FIG. 16, a link 148 engages a supporting rod 149 of segment 150 and is articulated, at its other end, to a rotatably mounted disk 151, the motion of the latter being brought about by a piston rod 152 protruding from a jack 153 supplied from a conduit 154 with pressure air admitted between the two tire-carrying plates or half flanges.

It will thus be seen that I have disclosed a machine for the reconditioning of a worn tire which, when mounted between supporting disks such as those shown at 35, 45 or 101, has its sides overlain by the peripheries of these disks so that its interior forms a sealed space for the admission of a pressure fluid (e.g. via the axially perforated shaft 102 shown in FIG. 7). The various seating means illustrated in FIGS. 7–16, engageable with the tire beads, are all disposed on confronting faces of the two disks inwardly of the peripheries of the latter so as not to interfere with their sealing operation, each of these seating means including two sets of radially movable segments (100, 122, 135, 139, 142, 150) interconnected for joint displacement by an associated control member (104, 112, 120, 121, 125, 132, 137, 141, 147, 151). As particularly described in connection with FIGS. 7 and 16, the control member may respond to pressure of a rigidifying fluid admitted into the interior of the tire between the two sealing disks.

What I claim is:

1. A machine for reconditioning a worn pneumatic tire, comprising a frame, a pair of coaxial shafts journaled on said frame, a pair of parallel disks mounted on confronting ends of said shafts, said disks being provided with seating means engageable with the beads of a tire to be reconditioned for holding said tire centered on the axis of said shafts in overlapping relationship with said disks whereby the interior of said tire is sealed by said disks upon engagement of the tire by said seating means, tire-inflating means for admitting a pressure fluid into said interior, drive means for rotating said disks together with the inflated tire about said axis, and shaping means on said frame for operating on the surface of the rotating tire.

2. A machine as defined in claim 1 wherein one of said shafts is provided with a bore for the admission of said pressure fluid.

3. A machine as defined in claim 1 wherein said shaping means comprises a rod parallel to said axis, a tool carriage swingably mounted on said rod, means for axially displacing said carriage along said rod, gauge means on said frame, and contactor means connected with said carriage for engagement with said gauge means during a traverse of the carriage to guide a tire-treating tool on said carriage.

4. A machine as defined in claim 1 wherein said seating means comprises two sets of radially displaceable segments respectively carried on the confronting faces of said disks, inwardly of the peripheries thereof, and control means for jointly displacing the segments of each set relatively to said axis.

5. A machine as defined in claim 4 wherein said control means comprises a member responsive to fluid pressure in said interior.

6. A machine as defined in claim 4 wherein said control means comprises an axially shiftable member provided with an annular ramp surface, said segments being provided with extensions bearing upon said ramp surface.

7. A machine as defined in claim 4 wherein said control means comprises a ring rotatable about said axis and provided with a series of peripheral camming surfaces, said segments having respective extensions in contact with said camming surfaces.

8. A machine as defined in claim 4 wherein said control means comprises a member movably centered on said axis and a set of links articulated to said member and to said segments.

9. A machine as defined in claim 8 wherein said control means further comprises a source of fluid pressure for axially displacing said member.

10. A machine as defined in claim 8 wherein said member is rotatable about said axis.

11. A machine as defined in claim 10 wherein said links are connected in parallel pairs between said member and respective segments, thereby constituting each segment a part of an articulated parallelogram, each of said links having an intermediate point pivotally joined to one of said disks whereby rotary entrainment of certain of said segments by a tire resting thereon, in a sense moving the entrained segments radially outwardly, similarly displaces the remaining segments of the same set.

References Cited

UNITED STATES PATENTS

| | | | |
|---|---|---|---|
| 518,112 | 4/1894 | Moore | 156—419 |
| 1,330,128 | 2/1920 | Long | 156—96 |
| 1,648,132 | 11/1927 | Johnson | 156—419 |
| 1,606,695 | 11/1926 | Cole | 156—419 X |
| 1,792,462 | 2/1931 | Hudson | 156—419 |
| 1,834,559 | 12/1931 | Waner | 156—412 |
| 2,009,524 | 7/1935 | Schmidt | 156—96 X |
| 2,009,599 | 7/1935 | Woock | 156—96 |
| 2,490,445 | 12/1949 | Kuffler | 156—412 X |
| 3,047,049 | 7/1962 | Bader | 156—411 |

EARL M. BERGERT, *Primary Examiner.*

CLIFTON B. COSBY, *Examiner.*